United States Patent [19]

Park

[11] Patent Number: 5,711,735
[45] Date of Patent: Jan. 27, 1998

[54] POWER TRAIN OF AN AUTOMATIC TRANSMISSION FOR A VEHICLE

[75] Inventor: Donghoon Park, Kyungki-do, Rep. of Korea

[73] Assignee: Hyundai Motor Co., Seoul, Rep. of Korea

[21] Appl. No.: 515,164

[22] Filed: Aug. 15, 1995

[30] Foreign Application Priority Data

Aug. 18, 1994 [KR] Rep. of Korea ............. 94-20393

[51] Int. Cl.$^6$ .................. F16H 47/08; F16H 3/62
[52] U.S. Cl. .................. 475/44; 475/46; 475/47; 475/275
[58] Field of Search .................. 475/44, 46, 47, 475/55, 58, 275, 276, 281, 284

[56] References Cited

U.S. PATENT DOCUMENTS

| | | | |
|---|---|---|---|
| 2,180,021 | 3/1939 | GBX. | |
| 2,572,007 | 10/1951 | Burtnett | 475/46 |
| 3,270,585 | 9/1966 | Livezey | 477/46 X |
| 3,371,555 | 3/1968 | Tuck et al. | 475/44 |
| 3,613,479 | 10/1971 | Borneman | 475/44 X |
| 3,863,524 | 2/1975 | Mori et al. | 475/276 X |
| 4,224,837 | 9/1980 | Croswhite | 475/51 |
| 4,869,128 | 9/1989 | Ohkubo | 477/46 X |
| 4,939,955 | 7/1990 | Sugano | 475/46 |
| 4,942,779 | 7/1990 | Ohkubo | 477/46 X |
| 5,484,349 | 1/1996 | RA et al. | 475/275 |

FOREIGN PATENT DOCUMENTS

| | | |
|---|---|---|
| 1038414 | 9/1958 | Germany. |
| 2552880 | 6/1976 | Germany. |
| 2944900 | 6/1980 | United Kingdom. |
| 3713989 | 11/1987 | United Kingdom. |
| 3825733 | 2/1989 | United Kingdom. |
| 85/05666 | 12/1985 | WIPO. |

OTHER PUBLICATIONS

Johannes Looman, "Zahnradgetriebe—Grundlagen, Konstruktion, Anwendungen in Fahrzeugen, " second completely revised and extended edition, Springer Verlag Berlin Heidelberg 1988, ISBN 3-540-18307-8, pp. 20-25, and 172, 173.

Anton OTT, "Zur systematischen Synthese mehrgangige Umlaufrad-er-Schaltgetriebe, "ATZ (Automobiltechnische Zeitschrift), 70th annual set, 1968, part 1 in No. 1, pp. 1-6, part 2 in No. 3, pp. 104-108, part 3 in No. 4, pp. 131-134.

*Primary Examiner*—Khoi Q. Ta

[57] ABSTRACT

Disclosed is a power train of an automatic transmission for a vehicle, which includes a device for making a continuous shifting operation in the low speed region, directly connecting the power train with the output shaft of the engine so as to reduce the shifting shock impulses, and reducing the number of the one-way clutches so as to simplify the whole structure.

11 Claims, 6 Drawing Sheets

FIG.6

O : Activated

| Ranges | | B1 | B2 | C1 | C2 | C3 | B3 | F2 | Engine Brake |
|---|---|---|---|---|---|---|---|---|---|
| P | | | | | | | | | |
| R | | O | | | | | O | | O |
| N | | | | | | | | | |
| D | 1 | | O | | | | | O | |
| | CV | | O | | O | | | O | |
| | 2 | | | O | | | | O | |
| | 3 | | | O | O | O | | | O |
| III | 1 | | O | | | | | O | |
| | CV | | O | | O | | | O | |
| | 2 | | | O | | | O | | O |
| II | 1 | | O | | | | | O | |
| | CV | | O | | O | | O | O | O |
| L | 1 | | O | | | | O | | O |
| Hold Mode | | | O | | O | | | | O |

5,711,735

POWER TRAIN OF AN AUTOMATIC TRANSMISSION FOR A VEHICLE

BACKGROUND OF THE INVENTION

The present invention concerns a power train of an automatic transmission for a vehicle.

Generally the automatic transmission for a vehicle includes a transmission control unit, which automatically controls a plurality of clutches and brakes mounted in the gear train so as to adjust the gear ratios of the planetary gears according to the speed and load. Although the power train must normally include a compound planetary gear unit and at least five friction elements in order to produce four forward speeds and one reverse speed, but to improve the shifting operation more effectively, a compound planetary gear unit, seven friction elements three one-way clutches are required. This results in a complicated power train structure and increase in the weight thereof.

Further, the conventional automatic transmission comprises a limited number of shift phases, so that shifting shock impulses unavoidably occur and the speed shifting range is also restricted due to the limited number of the gear ratios. Thus it is difficult to achieve the optimum ratio of fuel to power performance. Moreover, the shifting shock impulses frequently occur due to the great input torque and frequent shifting operation in the low speed region. In addition, the input shaft and the gear train must be directly connected in the high speed region in order to make the power transmission more efficient. But the conventional transmission has no such means.

SUMMARY OF THE INVENTION

It is an object of the present invention to provide a power train of an automatic transmission for a vehicle with means for making a continuous shift operation in the low speed region so as to reducing the shifting shock impulses.

It is another object of the present invention to provide a power train of an automatic transmission for a vehicle which directly connects a gear train with the output shaft of an engine so as to improve the power transfer efficiency.

It is still another object of the present invention to provide a power train which can simplify the structure of a power train of an automatic transmission for a vehicle by reducing the number of one-way clutches and friction elements.

According to an embodiment of the present invention, a power train of an automatic transmission for a vehicle comprises:

a torque converter for changing the torque speed of the power of the engine;

a first shift part of a compound planetary gear unit mounted on an input shaft including a first ring gear connected via a first power transfer member with a second sun gear, the first ring gear being controlled by a friction element mounted on the housing of the transmission so as to serve as a reaction or input element, a plurality of first pinion gears engaged with the inside teeth of the first ring gear with a first planetary carrier being connected with the hub of the input shaft and a fourth power transfer member so as to selectively serve as an input or output element, a first sun gear connected via a second power transfer member with the turbine of the torque converter to serve as an input element, a plurality of second pinion gears being directly connected with the stator of the torque converter to serve as an input element by a second planetary carrier, third and fourth power transfer members, the power transfer members being connected together by a friction element, and a second sun gear controlled by a friction element to serve as a reaction element; and a second shift part of a simple planetary gear unit including a third ring gear for receiving the output of the first shift part, a plurality of third pinion gears engaged with the inside teeth of the third ring gear, a third planetary carrier for carrying the third pinion gears, the third planetary carrier being selectively connected with the third ring gear by a friction element, and the third pinion gears being connected with an output shaft by a fifth power transfer member, and a third sun gear controlled by a one-way clutch and a friction element so as to serve as a reaction element.

BRIEF DESCRIPTION OF THE DRAWINGS

FIG. 6 is a table showing the combination of the working elements of the inventive automatic transmission according to the shifting stages.

The present invention will now be described more specifically with reference to the drawings attached only by way of example.

DETAILED DESCRIPTION OF A PREFERRED EMBODIMENT

Figure 1:
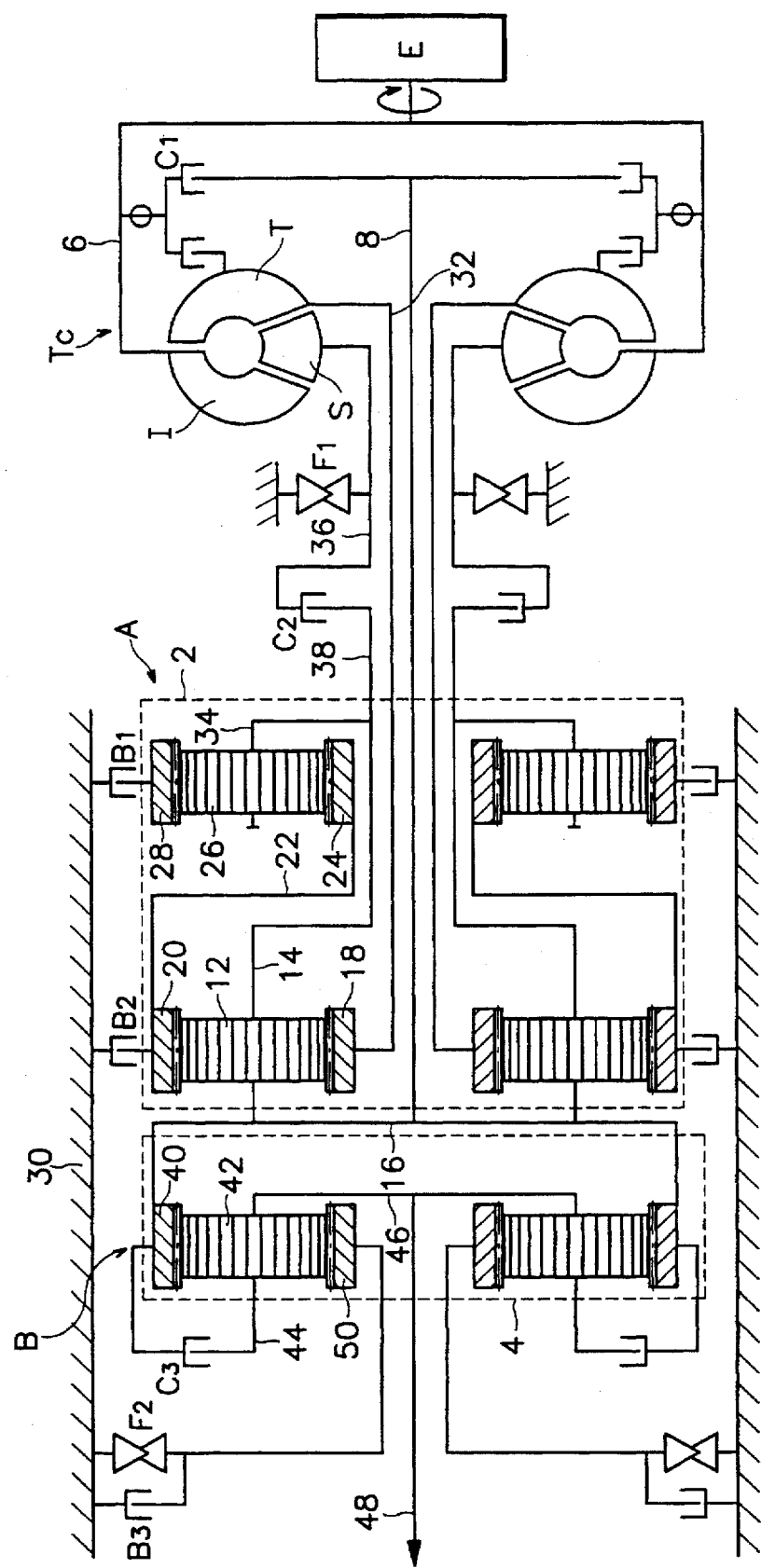
FIG. 1 is a schematic diagram for illustrating the power train of an automatic transmission for a vehicle according to an embodiment of the present invention.

Referring to FIG. 1, the inventive power train of an automatic transmission according to an embodiment of the present invention comprises a torque converter TC driven by an engine E, a first shift part A including a compound planetary gear unit 2 for transforming the torque of the torque converter by suitable gear ratios, and a second shift part B including a simple planetary gear unit 4 for additionally reducing the gear ratios of the first shift part A or simply transferring its output. The torque converter TC consists an impeller I directly connected with the crankshaft of the engine E, a turbine T arranged opposite to the impeller driven by oil, and a stator S disposed between the impeller I and the turbine T for redirecting the oil current to assist the impeller rotation. The torque converter TC may have the same structure as that disclosed in U.S. Pat. No. 3,613,479.

A shell cover 6 connects the impeller I with the engine E, including a friction element C1 for directly transferring the engine power to a first shaft (input shaft). The first shaft 8 is connected via a hub 16 with a first planetary carrier 14, which carries a plurality of first pinion gears 1 of the compound planetary gear unit 2. The first pinion gears 12 are engaged with a first sun gear 18 arranged among them and with a first ring gear 20 surrounding them.

The first ring gear 20 is operatively connected via a first power transfer member 22 with a second sun gear 24 whose periphery is engaged with a plurality of second pinion gears 26, which in turn are engaged with a surrounding second ring gear 28. The first ring gear 20 is so designed as to serve as a reaction element by means of a third friction element B2 mounted on the transmission housing 30 while the second ring gear 28 is so designed as to serve as a reaction element for reverse moving by means of a second friction element B1 mounted on the housing.

The first sun gear 18 is operatively connected with the turbine T by means of a second power transfer member 32. The first and second planetary carriers 14 and 34 of the first and second pinion gears 12 and 26 are associated with each other receiving the torque from the stator S of the torque converter TC through a third and fourth power transfer members 36 and 38. The fourth power transfer member 38 selectively receives the torque from the stator S by working a fourth friction element C2 for connecting the fourth power transfer member 38 with the third power transfer member 36, which is directly connected with the stator S. The third power transfer member 36 is gripped by a first one-way clutch F1 so that the stator S may be prevented from rotating counterclockwise when viewed from the engine side.

The hub 16 has an extension part connected with a third ring gear 40 of the second shift part B, so that the simple planetary gear unit 4 may reduce or simply receive the output gear ratios of the first shift part A. The third ring gear 40 of the simple planetary gear unit 4 surrounds a plurality of third pinion gears 42 to engage. A third planetary carrier 44 for carrying the third pinion gears 42 is connected via a fifth power transfer member 46 with a second shaft (output shaft) 48. A third sun gear 50 is engaged with the surrounding third pinion gears 42 and may selectively serve as a reaction element by working a sixth friction element B3 mounted on the transmission housing 30. The third sun gear is prevented from rotating counterclockwise by means of a second one-way clutch F2 when viewed from the engine side. The third ring gear 40 and third planetary carrier 44 are designed to rotate together by working a fifth friction element C3 at third speed mode.

Working the engine causes the impeller I of the torque converter TC, which is connected via the shell cover 6 with the output shaft of the engine, to rotate ejecting the oil in the torque converter towards the turbine. Then, the rotational force of the turbine is transferred via the second power transfer member 32 to the first sun gear 18 of the compound planetary gear unit 2. In this case, the stator S of the torque converter TC is prevented from rotating in the direction opposite to that of the engine by working of the first one-way clutch F1, thus enhancing the torque of the torque converter. The torque of the turbine T is transferred via the second power transfer member 32 to the first sun gear 18 to rotate the first pinion gear 12 counterclockwise when viewed from the engine side. However, in "N" and "P" ranges as shown in FIG. 6, no element works so that the engine power is not transmitted.

Setting the shift lever (not shown) to the forward "D" range, the third friction element B2 of the first shift part A is engaged so as to lock the second sun gear 24 and the first ring gear 20 of the compound planetary gear unit 2. Then, the first sun gear 18 serves as an input element and the first ring gear 26 as a reaction element, so that the first planetary carrier 14 serves as an output element.

Figure 4:
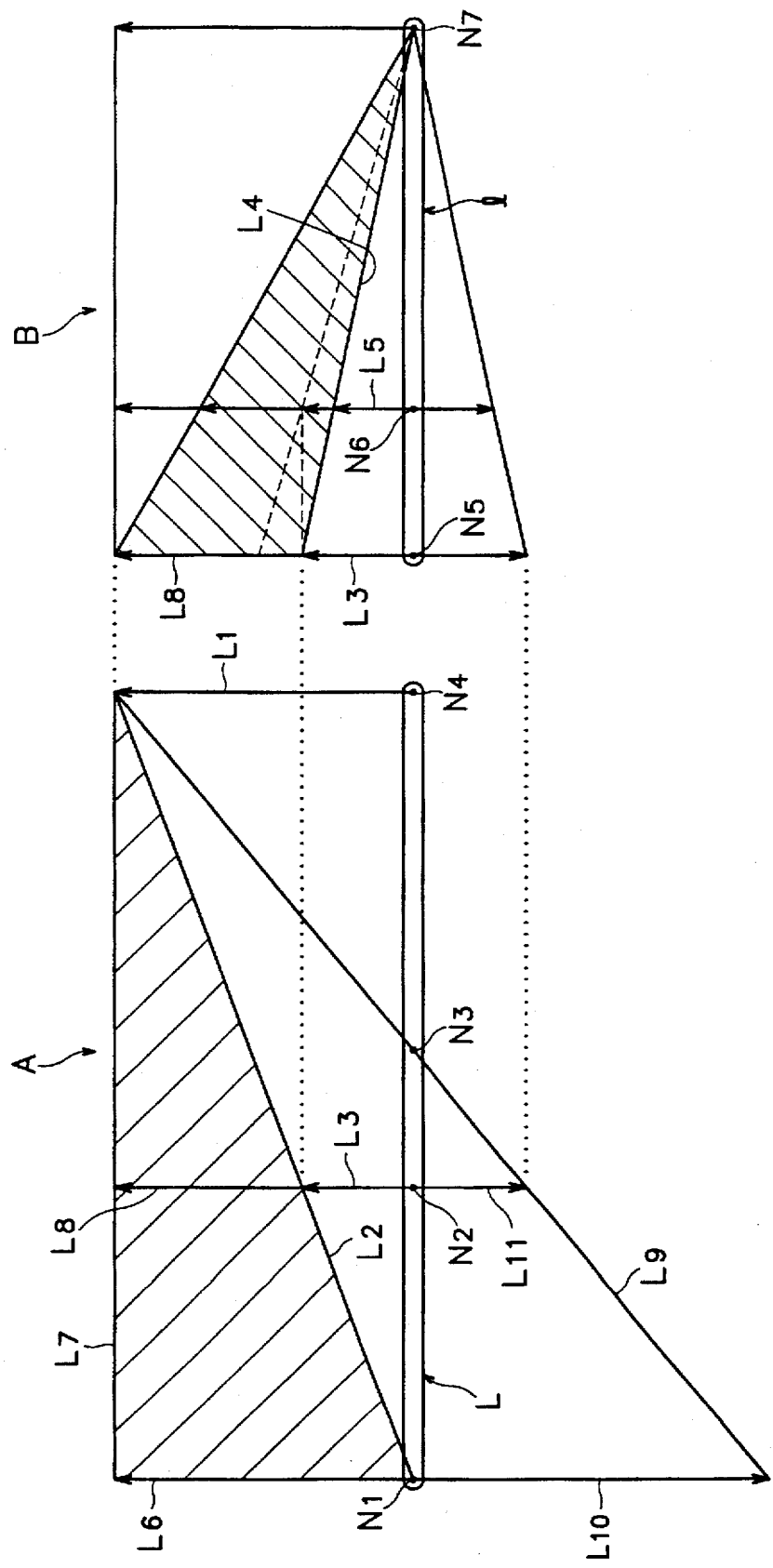
FIG. 4 is a graph schematically describing the speed rates of the inventive automatic transmission by means of lever analogy.

The gear ratios may be described in lever analogy as shown in FIG. 4. It is assumed that the left end of a lever L is the first node N1 consisting of the second sun gear 24 and the first ring gear 20, a first adjacent point the second node N2 of the first and second planetary carriers 14 and 34, a second adjacent point the third node N3 of the second ring gear 28, and the right end the fourth node N4 of the first sun gear 18. Thus, the fourth node N4 becomes the input point and the first node N1 the fixed point. Then, a line L1 of an arbitrary length is drawn vertically from the fourth node N4 to represent the amount of the input speed. Next a connecting line L2 is drawn connecting the upper end of the input speed line L1 with the first node N1. For example, if there is drawn the shortest line L3 between the second node N2 and the connecting line L2, the line L3 becomes the output speed line at the second node N2. Hence, the gear ratio may be expressed by the fraction of input speed line/output speed line (L1/L3), which is regarded as the first speed gear ratio.

The first speed gear ratio is transferred via the first planetary carrier 14 to the second shift part B. Thus, the torque of the first shift part A is transferred to the third ring gear 40 of the simple planetary gear unit 4 reduced by the reaction force of the third sun gear 50 to be outputted via the third planetary carrier 44.

Likewise, the gear ratios of the second shift part B may also be described in lever analogy represented by reference symbol "1" in the right side of FIG. 4. In this case, it is assumed that the left end of the lever "1" is the fifth node N5 consisting of the ring gear 40, the first adjacent point the sixth node N6 of the third planetary carrier 44, and the right end the seventh node N7 of the third sun gear 50. The torque of the first shift part A is input to the fifth node N5 assumed to have as its magnitude the length of a line L3 arbitrarily drawn vertically from the fifth node NS. The line L4 connecting the upper end of the line L3 with the seventh node N7 depicts the reduction rate of the output, so that the shortest line L5 from the sixth node N6 to the line L4 represents the output speed of the second shift part B which is the final gear ratio of the whole gear train. This final gear ratio is transferred from the third planetary carrier 44 via the fifth power transfer member 46 to a differential gear (not shown) to drive the driving axle of the vehicle.

In the first speed, the value of the final gear ratio is obtained by multiplying the reduction rate of the compound planetary gear unit 2 by the reduction rate of the simple planetary gear unit 4. Although the third sun gear 46 is locked in one direction by working of the second one-way clutch F2, the engine brake is not held when coasting, and therefore the sixth friction element B3 is manually worked to hold the engine brake. When the speed of the stator S reaches a predetermined value or the torque converter TC gets to the coupling condition, the transmission control unit works the fourth friction element C2 so as to directly connect the stator S with the fourth power transfer member 38. Since the torque of the stator S is added to the first speed of the fourth power transfer member 38, the rotational speed of the first planetary carrier 14 is increased more than the first speed. In this case, the torque of the turbine T is reduced by the amount transferred from the stator S to the fourth power transfer member 38 decreasing the total output torque.

Figure 2:
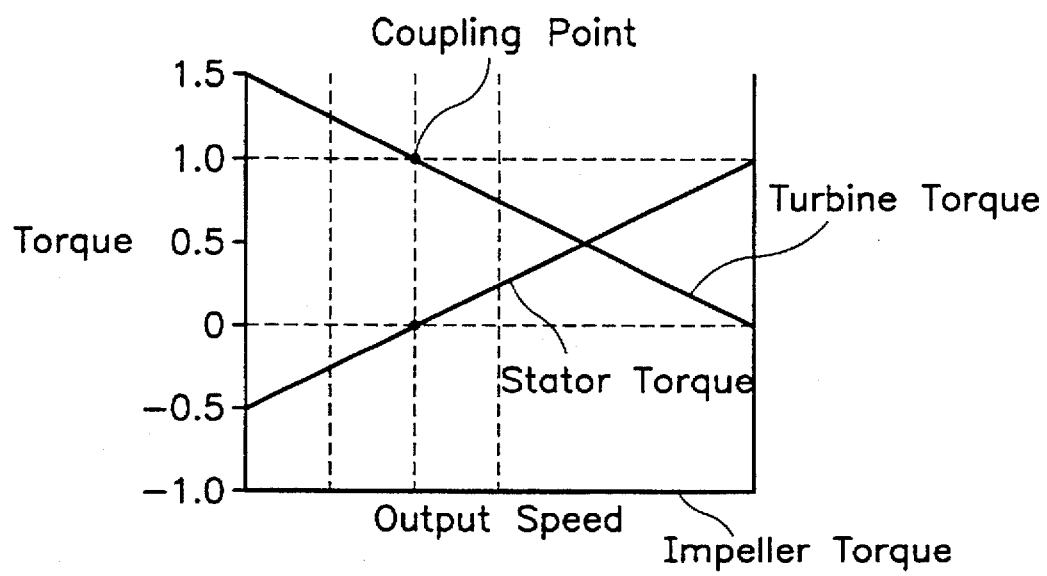
FIG. 2 is a graph illustrating the relationship between the torques of the turbine and stator and the output speed at automatic continuous shifting mode in an automatic transmission of FIG. 1.
Figure 3:
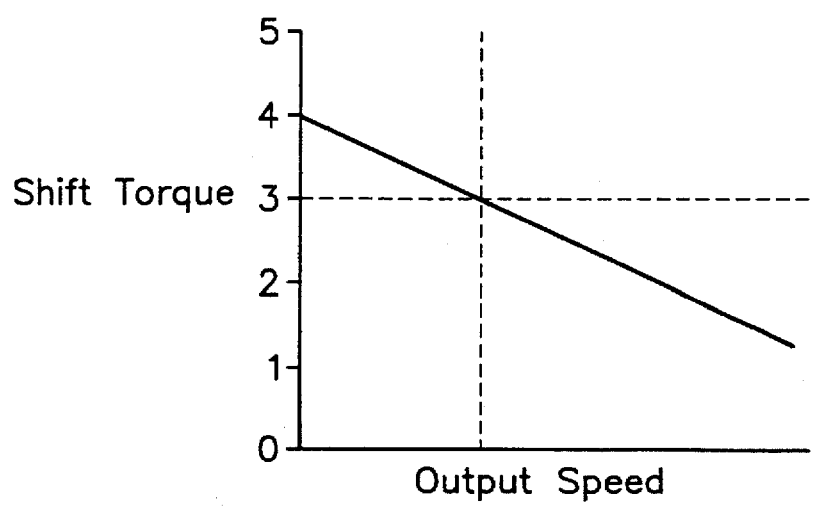
FIG. 3 is a graph illustrating the relationship between the output torque of the inventive automatic transmission and the output speed at automatic continuous shifting mode.

This represents a continuous shifting condition before making the up-shift toward the second speed, where the relationship between the output speed and the torque is illustrated in FIGS. 2 and 3. The continuous shifting operation begins just when the torque of the stator S is transferred to the first planetary carrier 14. In this case, the torque of the impeller is maintained constant, but the torque of the turbine is decreased while increasing the torque of the stator. As the output speed is increased, the rate of the transmission torque is decreased, so that the shifting operation is continuously performed until the torque converter resumes the coupling condition, where the shift ratio is automatically determined according to the vehicle load. The small vehicle load causes the torque converter to get to the coupling condition in a relatively short period of time thus shortening the time for directly connecting the stator S with the fourth power transfer member 38, while the large vehicle load causes the torque converter to get to the coupling condition in a relatively long time thus making it longer to operate in the low speed region.

In such a shifting mode, when the fourth friction element C2 is released to cut off the torque from the stator S to the fourth power transfer member 38, the shifting is immediately carried out to the first speed mode to increase the torque thus resulting in a large kickdown. On the other hand, keeping the stator S connected with the fourth power transfer member 38 causes the stator to receive a reverse torque as in stalling, so that the speed of the stator S is decreased and the torque of the turbine T increased thus resulting in the increase of the total torque to obtain a small kickdown. At this time, there occurs no shifting shock, but the shock impulses that may occur when connecting or disconnecting the stator with the fourth power transfer member 38 by means of the fourth friction element C2 are absorbed by the torque converter TC serving as a damper because the stator S is contained in the torque converter TC. In this case, the value of the final gear ratio is obtained by multiplying the reduction rate of the compound planetary gear unit by the reduction rate of the simple planetary gear unit 4. Of course, no engine brake is held when coasting.

In this automatic continuous shifting mode, if the speed of the stator S reaches a predetermined value or the torque converter TC gets to the coupling condition with increase of the vehicle speed, the transmission control unit releases the third friction element B2 and works the first friction element C1. Thus, the engine output is transferred via the first friction element C1 to the first shaft 8 to the first planetary carrier 14 of the compound planetary gear unit 2 and via the second power transfer member 32 to the first sun gear 18. As a result the compound planetary gear unit 2 receives power from the two input elements.

Hence, as shown in FIG. 4, the first and fourth nodes N1 and N4 of the first shift part A serve as the input terminal, and therefore the output speed of the first shift part A may be represented by the straight line L8 vertically drawn from the second node N2 to the line L7 connecting the upper ends of the input speed lines L1 and L6. Consequently, the planetary gear unit 2 is directly connected with the engine so as to produce the second speed gear ration, and the second shift part B carries out a speed reduction as in the first speed. In this case, since the fourth friction element C2 is not worked, the stator S idles resulting in the zero loss of the torque converter TC. This shift is carried out when there is almost no or a very little difference between the speeds of the turbine T and the first planetary carrier 14 and the speed of the engine, thus minimizing the shift shock impulses. The value of the final gear ratio in the second speed is obtained by multiplying the reduction rate of the compound planetary gear unit when the same is directly connected, i.e., 1 by the reduction rate of the simple planetary gear unit.

As the vehicle speed is increased, the transmission control unit additionally works the fourth friction element C2 of the first shift part A and the fifth friction element C3 of the second shift part B, so that the first and second shift parts are directly connected with the engine to produce the third speed gear ratio. Hence, the output speed of the first shift part A may be represented by the line L8 outputted via the second shift part B without any modification. In this case, the engine is directly connected with the torque converter together with the all the elements of the first and second shift parts, and therefore the optimum power transfer efficiency is secured and the engine brake may be held when coasting. Further, the shift shock impulses occur very low due to the low engine torque.

Figure 5:
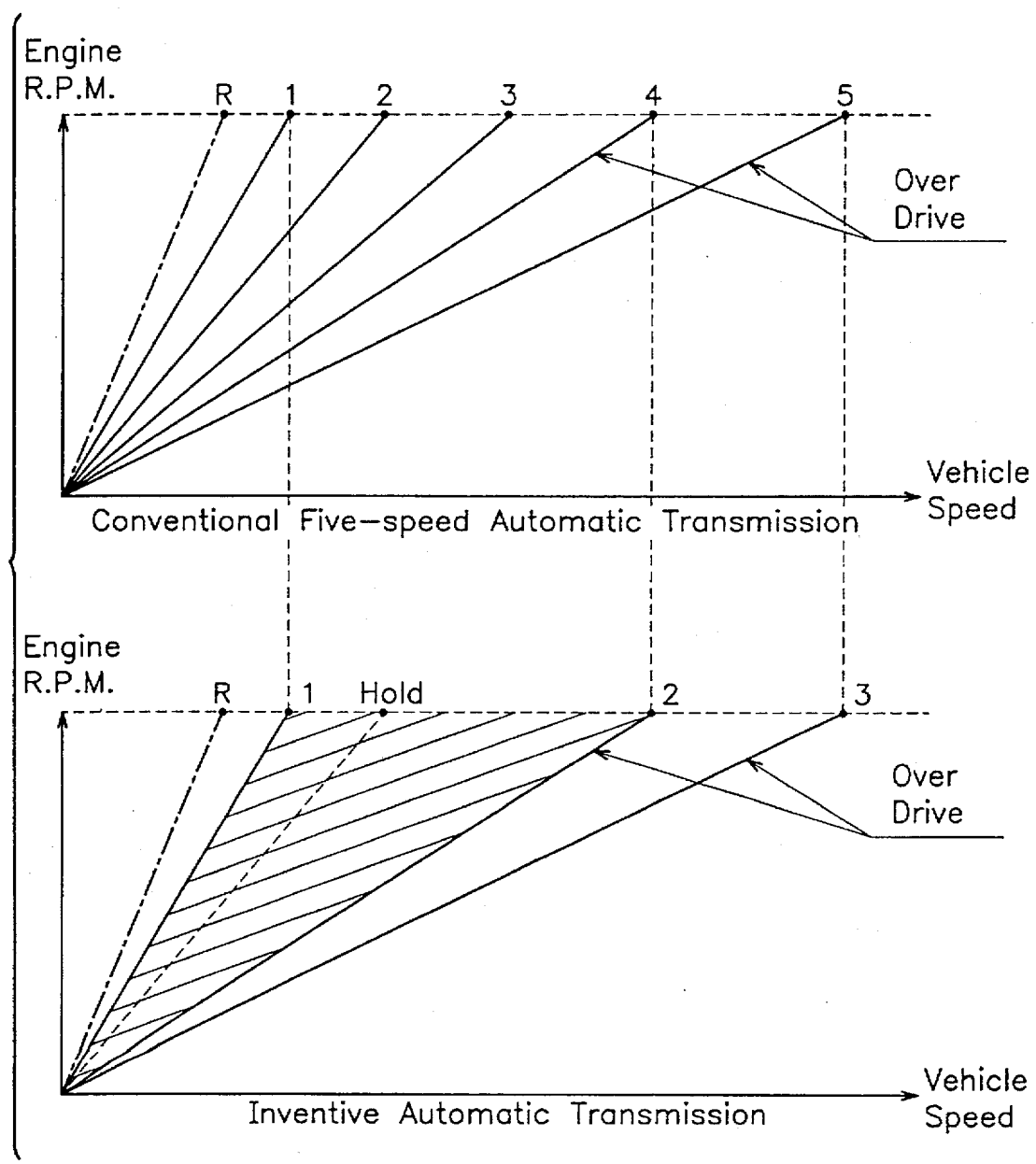
FIG. 5 is a graph comparing the distribution of the gear ratios of the inventive automatic transmission with that of a conventional five-speed automatic transmission.

As shown in FIG. 6, the engine brake may be held in range "III" when coasting because the fourth and sixth friction elements C2 and B3 are worked. Likewise, in the range "II" of the automatic continuous shifting mode, the engine brake may be held because of the working of the fourth and sixth friction elements C2 and B3. Additionally, in range "L", the engine brake may be held because the third and fourth friction elements B2 and B3 are worked. Hereinbefore described is the shifting procedure in the forward moving. As shown in FIG. 5, the inventive automatic transmission has the first speed gear ratio same as that of a conventional automatic five-speed transmission, and performs the continuous automatic gear shifting to the fourth speed gear ratio, thereby obviating the shift shock impulses in the low speed region where there may occur serious shift shock impulses.

Setting the shift lever to the reverse range "R", the transmission control unit works the second friction element B1 of the first shift part A and the sixth friction element B3 of the second shift part B, so that the first sun gear 18 of the compound planetary gear unit 2 serves as the input element, the ring gear 28 as a reaction element, and the third planetary carrier 44 as the output element. Then, as shown in FIG. 4, the reverse moving gear ratio may be represented by the straight line L11 vertically drawn from the second node N2 to the straight line L9 connecting the upper end of the input speed line L1 and the third node N3. The reverse moving gear ratio is again reduced by the third sun gear 50, the reaction element of the second shift part B, transferred via the second shaft 48 to the differential gear(not shown).

When there is needed the second speed hold, for example, there occur slips of the drive wheels on slippery roads, the transmission control unit works the third and fifth friction elements B2 and C3 to make the first shift part A carry out a gear shift to the first speed and the simple planetary gear unit 4 of the second shift part B directly connected with the engine, so as to form different gear ratios between the first and second speeds in the second shift part B, as shown in FIG. 4. This speed mode makes the engine brake be held when coasting, and may also be employed when setting the shift lever to range "II". The friction elements are selectively combined according to the shift ratios, as shown in the table of FIG. 6.

As described above, the advantages oft he inventive automatic transmission are summarized as follows:

1) The gear shift is automatically and continuously carried out especially in the low speed region where the operation time is short and the shift shock impulses occur greatly, thus improving the shift operation.

2) In the high speed region where the shift shock impulses are ignorable but requires a high power transfer efficiency, the shift mechanism is directly connected with the engine maximizing the fuel efficiency.

3) The number of the friction elements and one-way clutches is reduced compared to the conventional automatic transmission but improves the operation, thus reducing the production cost and the weight.

Figure 7:
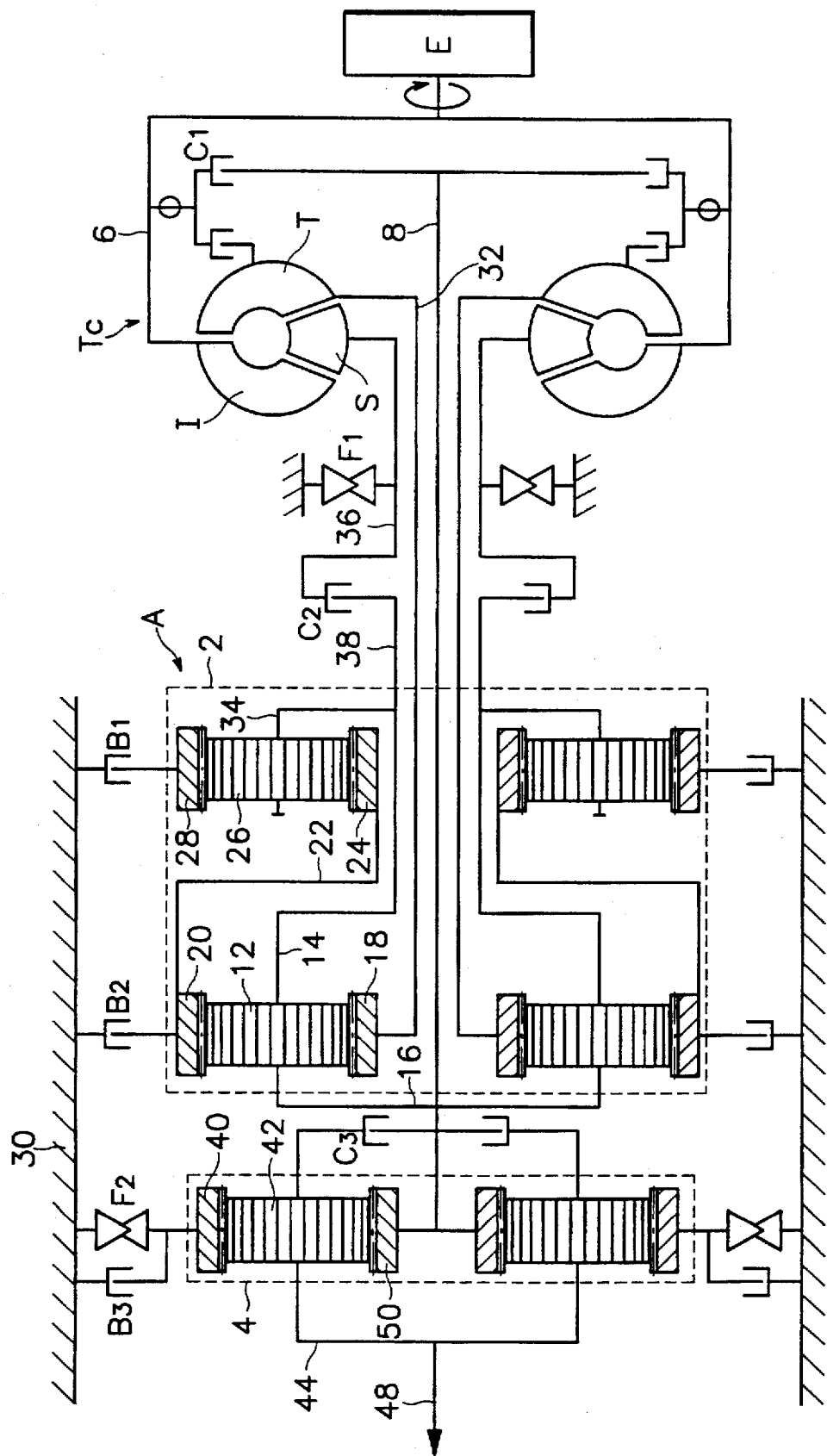
FIG. 7 is a diagram schematically illustrating the power train of an automatic transmission according to another embodiment of the present invention.

Another embodiment of the present invention as shown in FIG. 7 illustrates a slightly different structure in the second shift part B, but the first shift part A has the same structure as in FIG. 1. In this embodiment, the second shift part B employs the third sun gear 50 or the third sun gear 50 and the third planetary carrier 44 as the input terminal(s), the third planetary carrier 44 as the output terminal, and the third ring gear 40 as the reaction element. The shift operation is the same as in the first embodiment.

The second one-way clutch F2 grips the third ring gear 40 in the first speed, continuous shifting stage, and the second speed, while the fifth friction element C3 is worked to wholly rotate the simple planetary gear unit 4. In the reverse moving, the sixth friction element B3 is worked to prevent the simple planetary gear unit from rotating in the same direction as the engine, so that the third ring gear 40 serves as the reaction element. The inventive transmission is more effectively applied to the F-R (Front Engine Rear Drive) vehicle than to the F-F (Front Engine Front Drive).

What is claimed is:

1. A power train of an automatic transmission for a vehicle comprising:

a torque converter for changing a torque speed of power from an engine;

an input shaft;

a compound planetary gear unit including a first ring gear, a first sun gear, first pinion gears in a gearing relationship with said first ring gear and said first sun gear, a first planetary carrier being connected to said first pinion gears, a second ring gear, a second sun gear, second pinion gears in a gearing relationship with said second ring gear and said second sun gear, and a second planetary carrier being connected to said second pinion gears;

said first planetary carrier operationally connected to said input shaft and said second planetary carrier;

said first sun gear operationally connected to a turbine of said torque converter such that said first sun gear serves as an input element;

said second sun gear being connected to said first ring gear;

a first friction element mounted to a housing of said automatic transmission for selectively fixing rotation of said first ring gear such that said first ring gear and said second sun gear serve as one of an input element and a reaction element; and a second friction element operationally connected to a stator of said torque converter and said second planetary carrier, said second friction element selectively, operationally connecting said stator and said second planetary carrier; and a simple planetary gear unit operationally connected to said compound planetary gear unit and an output shaft, said simple planetary gear unit including a third ring gear, a third sun gear, third pinion gears in a gearing relationship with said third ring gear and said third sun gear, and a third planetary carrier being connected to said third pinion gears, said third ring gear being operationally connected to said input shaft.

2. A power train of an automatic transmission as defined in claim 1 further comprising:

a third friction element operationally connected to said third ring gear and said third planetary carrier for selectively, operationally connecting said third ring gear and said third planetary carrier;

a one-way clutch operationally connected between said third sun gear and said housing of said automatic transmission;

a fourth friction element mounted on said housing of said automatic transmission for selectively fixing rotation of said third sun gear such that said fourth friction element in cooperative operation with said one-way clutch cause said third sun gear to selectively serve a reaction element; and a power transfer member connecting said third planetary carrier and said output shaft.

3. A power train of an automatic transmission as defined in claims 1, further comprising:

a third friction element connected to said third ring gear and said third planetary carrier for selectively, operationally connecting said third ring gear and said third planetary carrier.

4. A power train of an automatic transmission as defined in claim 1 further comprising:

a power transfer member connecting said third planetary carrier and said output shaft.

5. A power train of an automatic transmission as defined in claim 1 further comprising:

a one-way clutch operationally connected between said third sun gear and said housing of said automatic transmission; and a fourth friction element mounted on said housing of said automatic transmission for selectively fixing rotation of said third sun gear such that said fourth friction element in cooperative operation with said one-way clutch cause said third sun gear to selectively serve a reaction element.

6. A power train of an automatic transmission as defined in claim 1, wherein said compound planetary gear unit is mounted on a shaft in linear alignment with a shaft on which said simple planetary gear unit is mounted.

7. A power train of an automatic transmission for a vehicle comprising:

a torque converter for changing a torque speed of power from an engine;

an input shaft;

a compound planetary gear unit including a first ring gear, a first sun gear, first pinion gears in a gearing relationship with said first ring gear and said first sun gear, a first planetary carrier being connected to said first pinion gears, a second ring gear, a second sun gear, second pinion gears in a gearing relationship with said second ring gear and said second sun gear, and a second planetary carrier being connected to said second pinion gears;

said first planetary carrier operationally connected to said input shaft and said second planetary carrier;

said first sun gear operationally connected to a turbine of said torque converter such that said first sun gear serves as an input element;

said second sun gear being connected to said first ring gear;

a first friction element mounted to a housing of said automatic transmission for selectively fixing rotation of said first ring gear such that said first ring gear and said second sun gear serve as one of an input element and a reaction element; and a second friction element operationally connected to a stator of said torque converter and said second planetary carrier, said second friction element selectively, operationally connecting said stator and said second planetary carrier; and a simple planetary gear unit operationally connected to said compound planetary gear unit and an output shaft, said simple planetary gear unit including a third ring gear, a third sun gear, third pinion gears in a gearing relationship with said third ring gear and said third sun gear, and a third planetary carrier being connected to said third pinion gears, said third sun gear being operationally connected to said input shaft.

8. A power train of an automatic transmission as defined in claim 7, further comprising:

a third friction element operationally connected to said third sun gear and said third planetary carrier for selectively, operationally connecting said third sun gear and said third planetary carrier;

a power transfer member connecting said third planetary carrier and said output shaft;

a one-way clutch operationally connected between said third ring gear and said housing of said automatic transmission; and a fourth friction element mounted on said housing of said automatic transmission for selectively fixing rotation of said third ring gear such that said fourth friction element in cooperative operation with said one-way clutch cause said third ring gear to selectively serve a reaction element.

9. A power train of an automatic transmission as defined in claim 7, further comprising:

a third friction element operationally connected to said third sun gear and said third planetary carrier for selectively, operationally connecting said third sun gear and said third planetary carrier.

10. A power train of an automatic transmission as defined in claim 7, further comprising:

a power transfer member connecting said third planetary carrier and said output shaft.

11. A power train of an automatic transmission as defined in claim 7, further comprising:

a one-way clutch operationally connected between said third ring gear and said housing of said automatic transmission; and a fourth friction element mounted on said housing of said automatic transmission for selectively fixing rotation of said third ring gear such that said fourth friction element in cooperative operation with said one-way clutch cause said third ring gear to selectively serve a reaction element.

\* \* \* \* \*